United States Patent
Jung et al.

(10) Patent No.: US 8,954,487 B2
(45) Date of Patent: Feb. 10, 2015

(54) MANAGEMENT SERVER AND METHOD FOR PROVIDING CLOUD COMPUTING SERVICE

(75) Inventors: Sung-gun Jung, Anyang-si (KR);
Sung-jun Lee, Suwon-si (KR);
Byung-woan Kim, Seoul (KR);
Kyung-ah Chang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 647 days.

(21) Appl. No.: 12/756,712

(22) Filed: Apr. 8, 2010

(65) Prior Publication Data

US 2010/0325191 A1    Dec. 23, 2010

(30) Foreign Application Priority Data

Jun. 23, 2009  (KR) .................. 10-2009-0056185
Aug. 17, 2009  (KR) .................. 10-2009-0075898

(51) Int. Cl.
*G06F 15/16* (2006.01)
*G06F 9/455* (2006.01)

(52) U.S. Cl.
CPC ............ *G06F 15/16* (2013.01); *G06F 9/45558* (2013.01); *G06F 2009/45562* (2013.01)
USPC ............... 709/202; 709/203; 718/1; 718/100; 718/101; 718/102

(58) Field of Classification Search
CPC ....................................... G06F 15/16
USPC ............................................. 718/1
See application file for complete search history.

(56) References Cited

U.S. PATENT DOCUMENTS

| | | | |
|---|---|---|---|
| 5,774,668 A | | 6/1998 | Choquier et al. |
| 8,161,479 B2 | * | 4/2012 | Sedukhin et al. .................. 718/1 |
| 8,185,894 B1 | * | 5/2012 | Watson et al. .................... 718/1 |
| 2006/0190602 A1 | * | 8/2006 | Canali et al. .................. 709/226 |
| 2007/0043860 A1 | * | 2/2007 | Pabari .......................... 709/224 |
| 2008/0077713 A1 | | 3/2008 | Kim et al. |
| 2008/0080396 A1 | | 4/2008 | Meijer et al. |
| 2008/0320081 A1 | | 12/2008 | Shriver-Blake et al. |
| 2009/0113422 A1 | * | 4/2009 | Kani ............................... 718/1 |
| 2009/0125902 A1 | | 5/2009 | Ghosh et al. |
| 2009/0210875 A1 | * | 8/2009 | Bolles et al. ...................... 718/1 |
| 2010/0199285 A1 | * | 8/2010 | Medovich ...................... 718/104 |
| 2010/0318609 A1 | * | 12/2010 | Lahiri et al. .................. 709/205 |

FOREIGN PATENT DOCUMENTS

JP    2003-203156    7/2003
KR    10-2008-0027713    3/2008

OTHER PUBLICATIONS

"Virtual Machine Manager 2008"—Microsoft System Center, Sep. 2008.*

* cited by examiner

*Primary Examiner* — Randy Scott
(74) *Attorney, Agent, or Firm* — NSIP Law

(57) ABSTRACT

A management server and method for providing a cloud computing service at high speed and reasonable cost, are provided. The management server provides a virtual machine to a client as a computing resource. The virtual machine is multiplexed by operating multiple virtual devices on a single virtual machine. Accordingly, demand for computing resources may be predicted in advance and may be provided to a user more efficiently.

19 Claims, 6 Drawing Sheets

MANAGEMENT SERVER AND METHOD FOR PROVIDING CLOUD COMPUTING SERVICE

CROSS REFERENCE TO RELATED APPLICATIONS

This application claims the benefit under 35 U.S.C. §119 (a) of Korean Patent Application Nos. 10-2009-0056185, filed on Jun. 23, 2009, and 10-2009-0075898, filed on Aug. 17, 2009, the entire disclosure of each of which is incorporated herein by reference for all purposes.

BACKGROUND

1. Field

The following description relates to a cloud computing system, and more particularly, to a system for providing the resources of a cloud infrastructure more effectively.

2. Description of the Related Art

Cloud computing corresponds to an Internet ("cloud") based computing technology. In a computer network diagram, the Internet is depicted as cloud that has a hidden and complex infrastructure. Cloud computing provides Information technology (IT) related functions in the form of services. Users are able to use services through the Internet without expertise on the technical infrastructure or without having knowledge for control of the technical infrastructure.

For example, the users of a cloud based computing technology are provided with desired computing resources through the Internet at anytime, and at anywhere, using cloud computing. The computing resources are generally managed by an individual resource provider, such as a large-scale data center, and the like. The computing resources may include, for example, CPU capability, memory, storage capacity, development platforms, application programs, and the like. The services that the resource provider offers for a computing terminal are referred to as cloud computing services.

SUMMARY

In one general aspect, there is provided a management server for managing one or more servers to provide a cloud computing service, the management server including a virtual machine manager to deploy at least one virtual machine on the one or more servers in preparation for a client's request for the cloud computing service, a virtual device manager to deploy at least one virtual device on the deployed virtual machine in preparation for the client's computing service request, and a request handler to process the request for the computing service from the client and to provide the client with the deployed virtual machine and the deployed virtual device.

The management server may further include a resource pool including a management list for managing the virtual machines and the virtual devices that are operated on the one or more servers, wherein the resource pool is used to determine whether a virtual device is capable of being provided, based on the computing service request.

The management list may include at least one of status information, performance information, user access information, and computing service information, with respect to the virtual machine and the virtual device.

The management server may further include a predicting unit to predict a type and/or a number of virtual devices to be operated on the one or more servers.

The request handler may control the virtual machine manager and the virtual device manager to reserve the predicted number of virtual devices and enough virtual machines to support the predicted number of virtual devices, before the computing service request is received from the client, and may provide the reserved virtual devices in response to the computing service request.

The predicting unit may predict the minimum number of virtual machines that are needed for reserving the predicted type and/or the number of virtual devices.

The predicting unit may include a log information storing unit to accumulate and store log information of computing services, a log information collecting unit to receive information corresponding to the computing service request made by the client and to store the log information generated from the information of the computing service request, and an analyzing unit to analyze the type and/or the number of virtual devices to be operated on the one or more servers, based on the information stored in the log information storing unit.

The log information may include information of virtual devices requested by a plurality of clients, computing service usage duration, and computing service request time.

The management server may further include a storage device for storing user specific data generated for a computing service that a client has previously used; and in response to the client requesting a previously used computing service, the management server may restore the stored user specific data to a virtual device corresponding to the previously used computing service, and provide the restored virtual device to the client.

In another aspect, there is provided a method for providing a cloud computing service from a server farm including one or more servers, the method including receiving a cloud computing service request from a client, and performing a computing operation to be performed on the one or more servers based on the computing service request using at least one previously deployed virtual device, wherein the virtual device is operated on a virtual machine and the virtual machine is configured to be used in a multiplexed fashion.

The method may further include determining whether a virtual device according to the computing service request is capable of being provided, based on a resource pool that includes a management list for managing the virtual machines and the virtual devices that are operated on the one or more servers.

The management list may include at least one of status information, performance information, user access information, and computing service information, with respect to the virtual machine and the virtual device.

The method may further include predicting a type and a number of the virtual devices to be operated on the server farm, in advance, predicting enough virtual machines to support the predicted number of virtual devices, based on the prediction result, and deploying the predicted number of virtual machines on the one or more servers.

The predicting of the number of virtual machines may include predicting the minimum number of virtual machines needed for reserving the predicted type and/or the number of virtual devices.

The predicting of the type and/or the number of virtual devices may include storing log information of computing services of a plurality of clients in a log information storing unit, and predicting the type and/or number of virtual devices to be operated on the one or more servers based on the stored log information.

The log information may include information of virtual devices requested by a plurality of clients, computing service usage duration, and computing service request time.

The method may further include storing, in a storage device, user specific data generated for a computer service that has previously been used by the client, in response to the client requesting a previously used computing service, restoring the stored user specific data to a virtual device corresponding to the computing service request, and providing the restored virtual device to the client.

Other features and aspects may be apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of well-known functions and structures may be omitted for increased clarity and conciseness.

Figure 1:
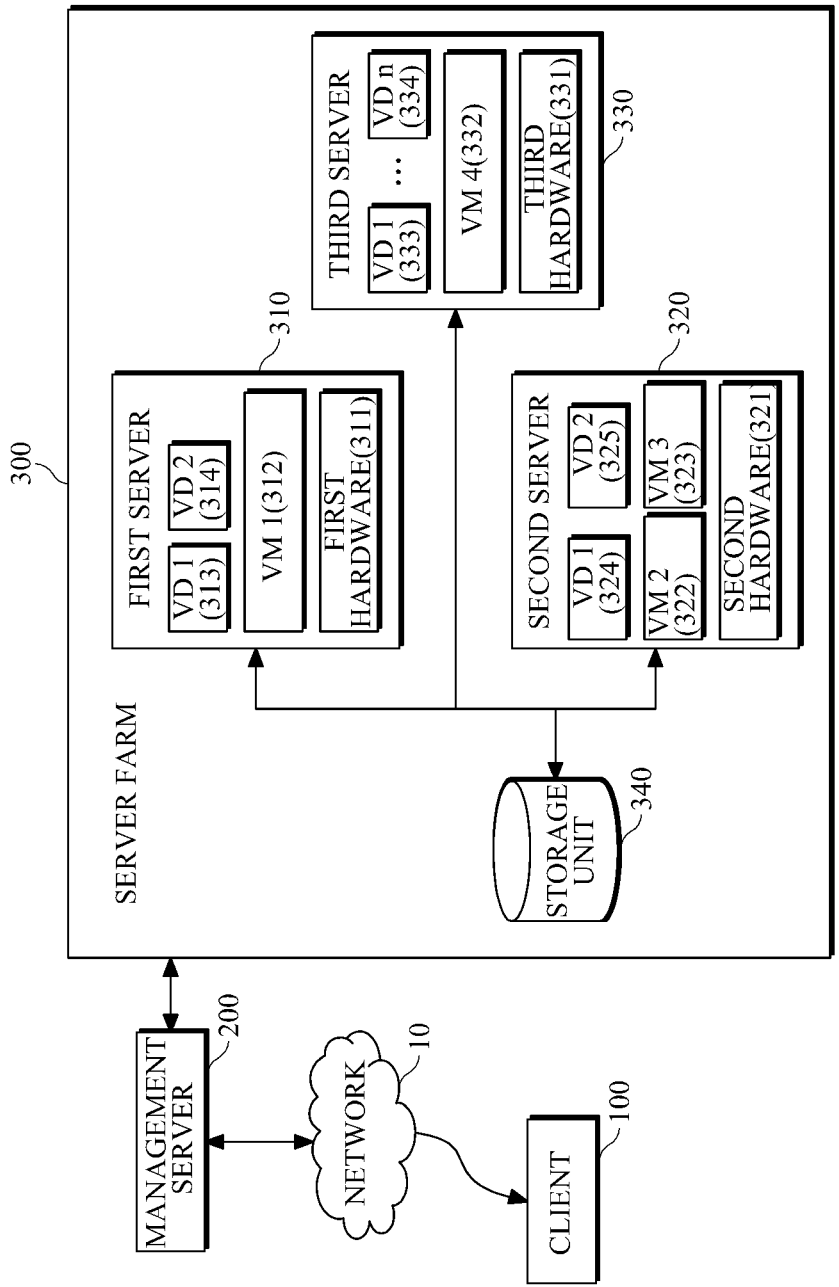
FIG. 1 is a diagram illustrating an example of a system for providing a cloud computing service.

FIG. 1 illustrates an example of a system for providing a cloud computing service. Referring to the example shown in FIG. 1, the system includes a client 100, a management server 200, and a server farm 300. The client 100, the management server 200, and the server farm 300 are connected to each other over a network 10. In some embodiments, the management server 200 may directly connect to the server farm 300, for example, through a wired or wireless connection.

Examples of the client 100 may include a mobile terminal, a digital television, a set-top box, an MP3 player, a portable multimedia player (PMP), a laptop, and the like, which are capable of network access.

The management server 200 functions as a gateway or a hub for the server farm 300, and may manage resources of one or more servers, for example, servers 310, 320, and/or 330. In addition, the management server 200 may control the one or more servers 310, 320, and 330 to operate a computing service using resource information stored in a storage unit 340. Although the management server 200 is provided externally of the server farm 300 in the example shown in FIG. 1, the management server 200 may be configured to be included in the server farm 300.

The server farm 300 is a plurality of centralized computer servers. In this example, the server farm 300 includes servers 310, 320, and 330 and the storage unit 340, and provides a computing service to the client 100. The number of servers is not limited to three, and each server may have its own operating system or the servers may share an operating system.

In an example where cloud computing is extended from business to business (B2B) to business to customer (B2C), it is desirable for the speed of responding to a computing service to be fast and efficient, otherwise, private users are likely to be disappointed. In addition, the charge for the computing service should be reasonable. Generally, in the case of a cloud computing service for B2B, a service provider checks a service available at the moment of a computing service request. When a virtual machine needed for the computing service is not present, a new virtual machine may be operated and an operated service may be registered in a list of computing services in use. However, the conventional cloud computing service is not suitable for private users due to a long response time from when the new virtual machine is activated until the computing service that the client requests is provided.

The cloud computing service providing system shown in FIG. 1 may operate to provide the cloud computing service even to private users as well as business users at high speed and at a reasonable cost. For example, the cloud computing service may provide a virtual device that is generated by emulating the virtual machine and operated on a virtual machine. The virtual device may be provided as a computing resource to the client 100.

The virtual machine may be a virtual computer that multiplexes physical hardware such that a plurality of different operating systems may be operated in a single piece of hardware. The virtual machine may be provided for a business cloud computing service. In comparison, the virtual device may be optimized to customer electronics (CE) that private users generally use. The virtual device may be generated by emulating or simulating a virtual machine in order to multiplex the virtual machine. The virtual device may include, for example, an operating system, a development platform, an application program for CE, and the like. Moreover, like the general virtual machine, the virtual device may be configured to have a plurality of application programs running thereon. Accordingly, it appears to the client 100 that the virtual device operates as a computing service.

Referring to the example shown in FIG. 1, the first server 310 includes first hardware 311, a first virtual machine 312, a first virtual device 313, and a second virtual device 314. In this example, the first virtual device 313 and the second virtual device 314 are operated on the first virtual machine 312.

The second server 320 includes second hardware 321, a second virtual machine 322, a third virtual machine 323, a first virtual device 324, and a second virtual device 325. In this example, the second virtual machine 322 and the third virtual machine 323 are operated on the second hardware 321. Also, the first virtual device 324 is operated on the second virtual machine 322, and the second virtual device 325 is operated on the third virtual machine 323.

The third server 330 includes third hardware 331, a fourth virtual machine 332, and first through nth virtual devices 333 and 334. In this example, the fourth virtual machine 332 is operated on the third hardware 331, and the first through nth virtual devices, 333 and 334, are operated on the fourth virtual machine 332. As described above, the cloud computing service that provides a client with a virtual device may be referred to as a device as a service (DaaS).

The servers described with reference to FIG. 1 are merely for purposes of example. It should be understood that the server farm may include any number of servers desired. Also, the servers may include any desired amount of virtual machines and virtual devices, and each virtual machine may have any desired amount of virtual devices operated thereon.

The management server 200 receives a cloud computing service request from the client 100. In response to a cloud computing service request, management server 200 manages one or more of the servers 310, 320, and 330 to operate a computing operation using at least one of the previously prepared virtual devices which are operated on one or more servers 310, 320 and 330. For example, the management server 200 may analyze service computing usage information of one or more clients including the client 100 that uses the server farm 300. The management server 200 may predict demand for computing resources running in the server farm 300. The demand includes one or more virtual devices and/or virtual machine. The management server 200 may reserve computing resources for the servers 310, 320, and 330 of the server farm 300 based on the prediction result.

For example, the management server 200 may predict that one thousand clients use the ANDROID® platform of GOOGLE® as a virtual device at approximately 5 o'clock. When the client 100 issues a computing service request, the management server 200 prepares the predicted service in advance and thus is capable of providing the service quickly. Accordingly, the demand for the virtual device and the virtual machine may be predicted so that a fast response speed and reduction in cost may be achieved.

Cloud computing may be based on a "pay-per-use" model which charges a user based on the usage of the service. Therefore, the cost may be reduced if an equivalent service is provided using the minimum resources. For example, if it is predicted that five virtual devices at most are operated on one virtual machine without difficulty, and the number of requested virtual devices which is currently predicted is 100, it may be determined that it is most effective to reserve twenty virtual machines.

Figure 2:
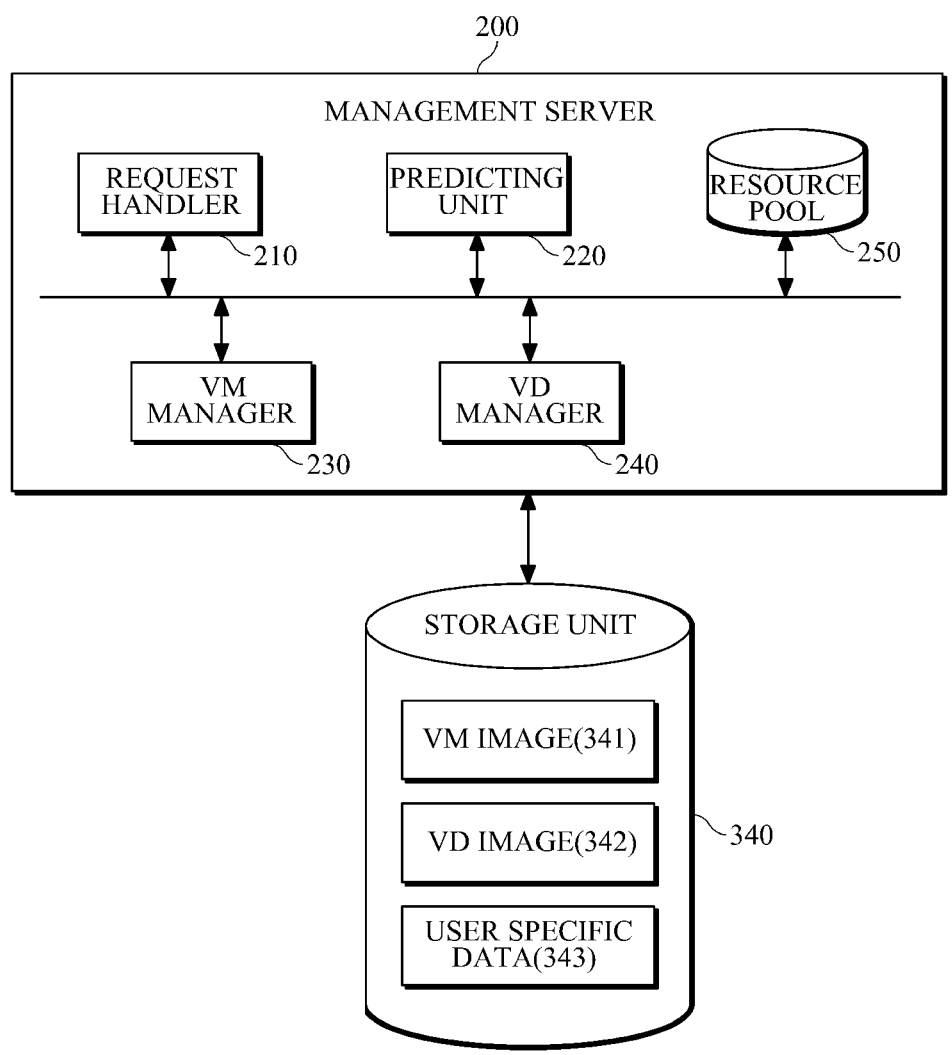
FIG. 2 is a diagram illustrating an example of a management server that manages cloud resources.

FIG. 2 illustrates an example of a management server that manages cloud resources.

Referring to the example shown in FIG. 2, the management server 200 includes a request handler 210, a predicting unit 220, a virtual machine (VM) manager 230, a virtual device (VD) manager 240, and a resource pool 250.

The request handler 210 controls operations of the predicting unit 220, the VM manager 230, the VD manager 240, and the resource pool 250 in order to process a computing service request of a client 100 (referring to FIG. 1) and provide the requested computing service.

In the example shown in FIG. 2, the request handler 210, the predicting unit 220, the virtual machine (VM) manager 230, the virtual device (VD) manager 240, and the resource pool 250 are described as separate units. However, it should be understood that one or more of the units may be combined.

The request handler 210 may determine whether a virtual device requested by the computing service request is available based on the resource pool 205 that includes a management list for managing all virtual machines and virtual devices that are operated by the servers of a server farm, for example, the server farm 300 (referring to FIG. 1). According to a determination result, the request handler 210 may perform an operation to provide the client 100 (referring to FIG. 1) with the virtual device requested.

The predicting unit 220 predicts a type and number of virtual devices to be operated on one or more servers of the server farm. The predicting unit 220 may analyze a history and a pattern of computing service requests by clients and computing service usage status for reserving virtual machines or virtual devices and predict a number of virtual machines and virtual devices that need to be reserved.

For example, the predicting unit 220 may predict the minimum number of virtual machines that are required for securing the predicted type and/or the number of the virtual devices so as to increase the resource use efficiency. In another example, the predicting unit 220 may predict the maximum number of virtual machines and virtual devices to guarantee available resources.

The request handler 210 controls the VM manager 230 and the VD manager 240 to reserve the predicted type and/or number of virtual devices and a predetermined type and/or number of virtual machines before the request of the client is received. Accordingly, upon receipt of the client's request, the request handler 210 is capable of providing the reserved virtual devices without a delay occurring because the request handler already has the reserved virtual devices and the reserved virtual machines.

The VM manager 230 performs operations with respect to the virtual machines, for example, loading of a virtual machine image, booting of a virtual machine image, and shut-down of a virtual machine instance. The virtual machine instance refers to a virtual machine which is launched and which is available to a server. The VM manager 230 may deploy, that is, boot and load at least one virtual machine on at least one server in preparation for the computing service request of the client. The VM manager 230 may deploy the requested virtual machine according to the prediction result of the predicting unit 220 on an available server of the server farm.

The VD manager 240 performs operations with respect to the virtual devices, for example, loading of a virtual device image, booting of a virtual device image, and shutting-down of a virtual device instance. The virtual device instance refers to a virtual device which is launched and which is available to a server. The VD manager 240 may deploy at least one virtual device on a deployed virtual machine in preparation for the computing service request of the client. The VD manager 240 may deploy the requested virtual device according to the prediction result of the predicting unit 220 on an available server of the server farm.

The resource pool 250 stores and manages a management list for managing the virtual machines and virtual devices that are in operation on one or more servers of the server farm. The management list may include status information, performance information, user access information, computing service information, and the like, with respect to the virtual machines and the virtual devices.

The storage unit 340 may store a virtual machine image 341, a virtual device image 342, and user specific data 343 as files. Although the storage unit 340 is provided in the server farm 300 separately from the management server 200 in FIG. 1, the storage unit 340 may be provided externally of the server farm 300 or may be configured to be integrated with the management server 200.

The virtual machine image 341 is an image that is used when operating a virtual machine on a server, and is used when operating a virtual device on the server. The user specific data 343 refers to all data that is generated and modified by the client using a computing service, and in response to the client's request.

The request handler 210 stores the user specific data 343 that is generated and stored with respect to the computing service used by the client in the storage unit 340. If the client issues a request for a previously used computing service, stored user specific data may be restored into a virtual device corresponding to the computing service request, and the restored virtual device may be provided to the client. The virtual device may be provided where the user specific data 343 is restored as the computing service, so that the client can be provided with the computing service using the virtual device in the same state where the user has previously used the virtual device.

Figure 3:
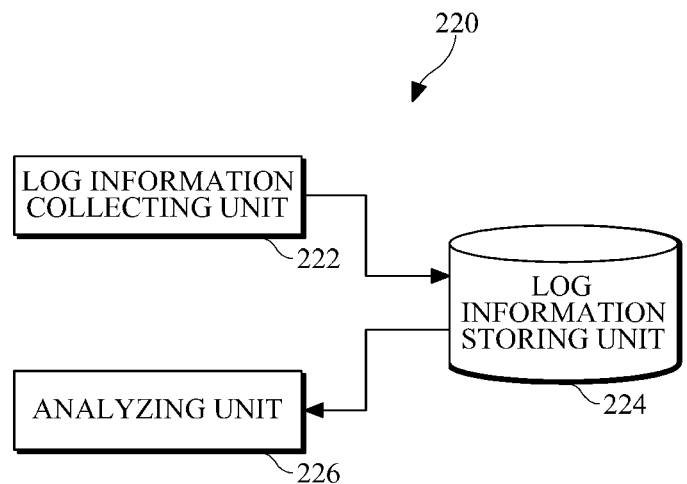
FIG. 3 is a diagram illustrating an example of a predicting unit that may be included in the management server illustrated in FIG. 2.

FIG. 3 illustrates an example of a predicting unit that may be included in the management server illustrated in FIG. 2.

Referring to FIG. 3, the example predicting unit 220 includes a log information collecting unit 222, a log information storing unit 224, and an analyzing unit 226.

The log information collecting unit 222 receives computing service request information of a client. The log information collecting unit 222 generates log information based on the computing service request information, and stores the generated log information in the log information storing unit 224. For example, the log information collecting unit 222 may store the log information in the log information storing unit 224, in response to the receipt of a computing service request. The log information may contain, for example, a type of a requested virtual device, a requested time for provision of the computing service, a duration of use of the computing service, client device information, user information, and the like.

The log information storing unit 224 may store log information collected each time a computing service request is received by the log information collecting unit 222. Log information of a plurality of clients may be stored in an accumulating manner. The log information in the log information storing unit 224 may be managed per client.

The analyzing unit 226 predicts a type and/or number of virtual devices to be operated on by one or more servers of the server farm based on the log information stored in the log information storing unit 224. The analyzing unit 226 may perform analysis, for example, through an existing statistical method or pattern discovery method. Once the type and/or the number of virtual devices are predicted, the number of virtual machine instances to be used may be calculated, and thus, the virtual device instances and the virtual machine instances may be reserved according to the prediction.

Figure 4:
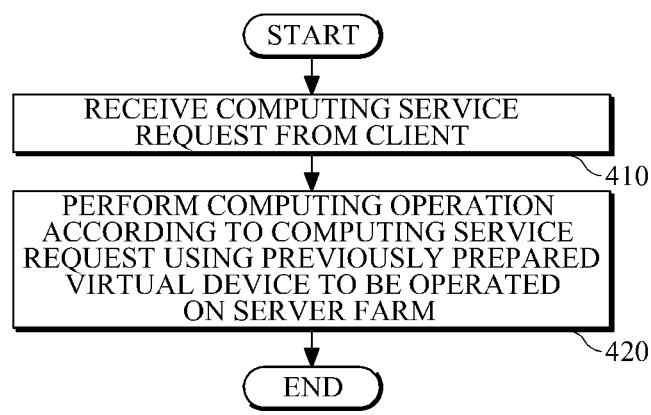
FIG. 4 is a flowchart illustrating an example of a method for providing a cloud computing service.

FIG. 4 illustrates an example of a method for providing a cloud computing service. Hereinafter, the method is described with reference to FIG. 4 and FIG. 1.

In operation 410, the management server 200 receives a computing service request from the client 100.

In operation 420, the management server 200 controls operations of one or more servers 310, 320, and 330 included in the server farm 300 to perform a computing operation. The computing operation may be performed using a previously prepared virtual device that is operated on the server farm 300, according to the computing service request. At least one virtual device may be operated on a virtual machine that is operated on the server of the server farm 300. The virtual device refers to information generated by emulating the virtual machine.

The management server 200 reserves virtual devices and virtual machine instances based on the above-described prediction. For example, the management server 200 may reserve one or more types and numbers of virtual devices and one or more virtual device instances. Accordingly, the management server 200 may respond to the computing service request of the client 100 instantly without taking time to load and boot a required virtual machine. Also, the management server 200 may use a virtual device configured to be suitable to a private user, thereby preventing the client 100 from excessively using cloud resources. Hence, the cost for use of resources by the client 100 may be reduced.

Figure 5A:
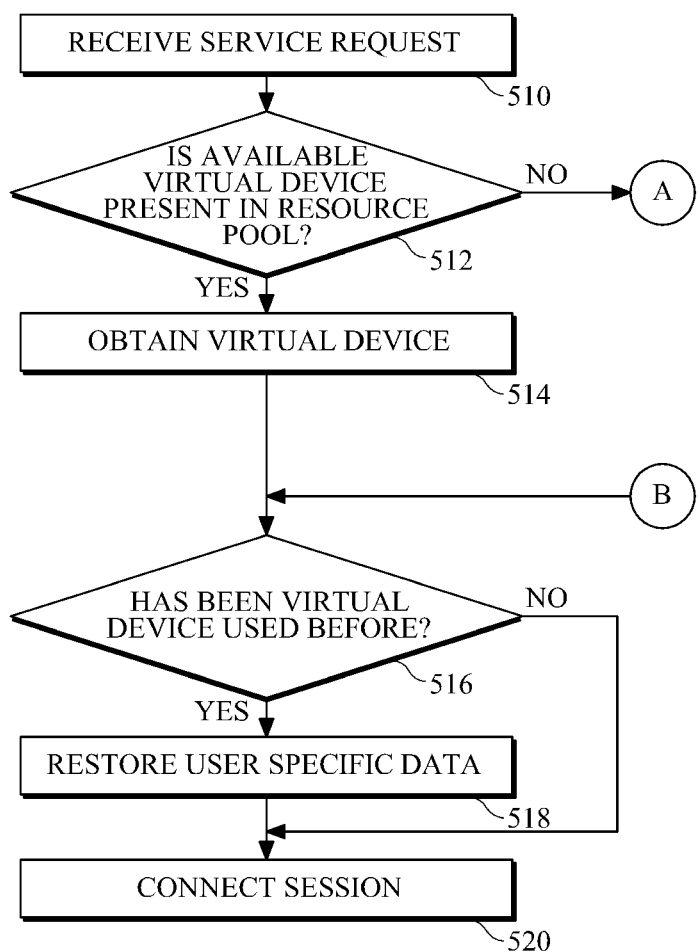
FIGS. 5A and 5B are flowcharts illustrating an example of a method for providing a computing service.
Figure 5B:
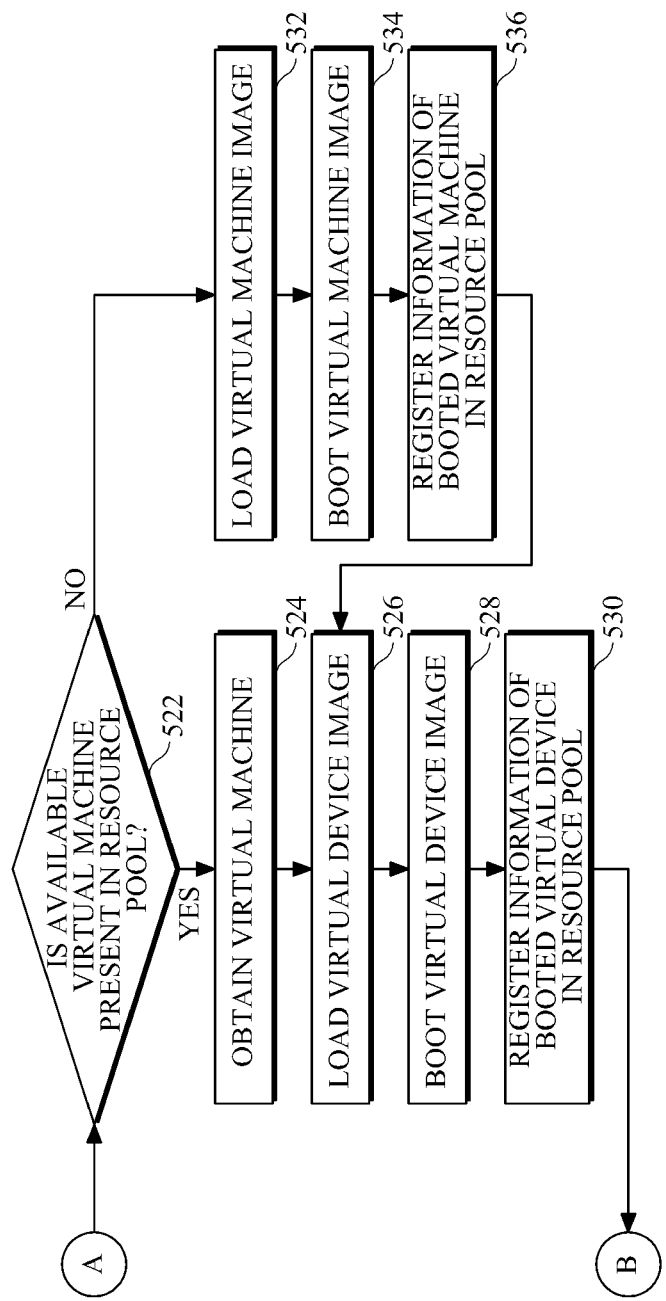

FIGS. 5A and 5B illustrate an example of a method for providing a computing service.

Referring to FIGS. 2, 5A, and 5B, in operation 510, the request handler 210 receives a computing service request of a client. The computing service request of the client may include information for requesting a specific virtual device.

Referring to FIGS. 2 and 5A, in operation 512, the request handler 210 determines whether a virtual device is available and present in the resource pool 250, by referring to a list managed by the resource pool 250. When the predicting unit 220 performs a prediction based on the computing service requests of clients on the network, and when it is determined in operation 512 that the virtual device is available and present in the resource pool 250, in operation 514 the request handler 210 obtains a virtual device from the resource pool 250 based on the service request. The operation of obtaining the virtual device may include verifying identifiers of available virtual devices currently available in the resource pool 250.

In operation 516, the request handler 210 determines whether the virtual device obtained based on the virtual device identifier has been previously used by the client. When it is determined that the obtained virtual device has been previously used by the client, the management server 200 loads user specific data of the client 100 from storage, for example, the external storage unit 340. The user specific data is generated when the client previously used the corresponding virtual device. In operation 518, the management server 200 restores the user specific data in the virtual device or connects the user specific data to the virtual device. When resource allocation of the request handler 210 is completed, in operation 520, a computing service for providing a computing result based on the client's request is provided to the client.

Conversely, when it is determined in operation 512 that the available virtual device is not present in the resource pool 250, the method proceeds to 'A'. Referring to FIGS. 2 and 5B, in operation 522 the request handler 210 verifies whether an available virtual machine (or a virtual machine instance) is present in the resource pool 250 by referring to a management list managed by the resource pool 250. When it is determined that there is no available virtual device in operation 512, and when it is determined that the available virtual machine is present in the resource pool 250 in operation 522, installation of the requested virtual device on the available virtual machine is performed.

To this end, in operation 524 the request handler 210 obtains the available virtual machine. In operation 526, the request handler 210 controls the VD manager 240 to load a virtual device image onto the virtual machine based on the client's service request. The virtual device image may be retrieved from storage unit 340. In operation 528, the VD manager 240 boots the virtual device image loaded onto the virtual machine. In operation 530, the request handler 210 registers information of the virtual device booted on a virtual device pool in the resource pool 250. Upon completion of operation 530, the method proceeds to "B." Then, the method proceeds with operations 516, 518, and 520.

In operation 512, when it is determined that the available virtual device is not present in the resource pool 250, and when an available virtual machine instance is not present in the resource pool 250 in operation 522, the request handler 210 installs a virtual machine for operating a virtual device, and then installs a virtual device requested by the client.

To generate a virtual machine instance, in operation 532 the request handler 210 controls the VM manager 230 to load the virtual machine image onto a predetermined server of the server farm 300 on which the virtual machine will be operated. In operation 534, the VM manager 230 boots the loaded virtual machine image. Thereafter, in operation 536 the request handler 210 registers information of the virtual machine corresponding to the virtual machine instance which has been generated by booting the virtual machine image in a virtual machine pool of the resource pool 250.

Once the virtual machine information is registered, in operation 526 the request handler 210 controls the VD manager 240 to load a virtual device image from the storage unit 340 in accordance with the client's computing service request to the registered virtual machine instance. In operation 528, the VD manager 240 boots the loaded virtual device image. Then, in operation 530 the request handler 210 registers information of the virtual device booted on the virtual device pool of the resource pool 250. Thereafter, the method proceeds to operations 516, 518, and 520.

Figure 6:
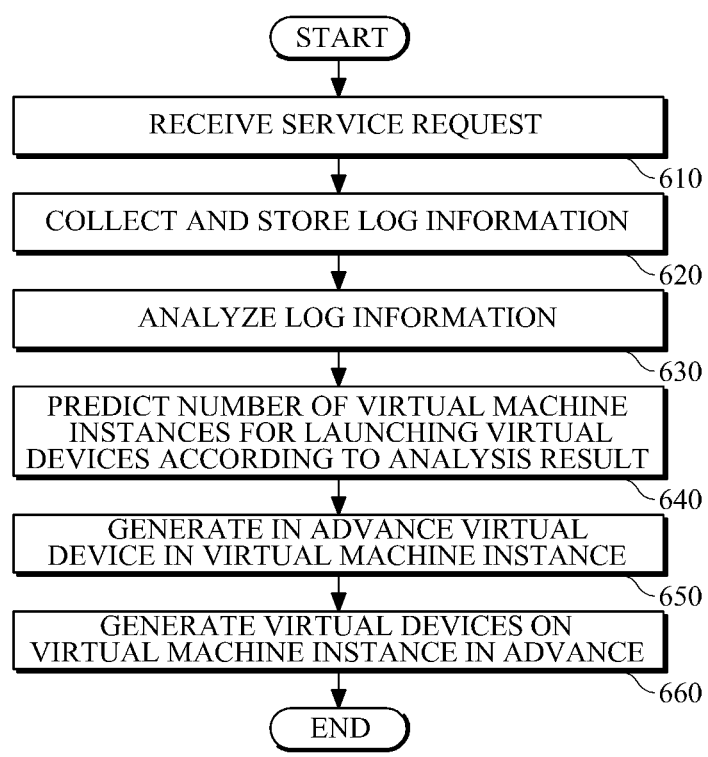
FIG. 6 is a flowchart illustrating an example of a method for predicting a cloud resource.

FIG. 6 illustrates an example of a method for predicting a cloud resource. Referring to FIGS. 2, 3, and 6, when a client issues a DaaS service request, in operation 610 the request handler 210 receives the computing service request, and transmits information of the received computing service request to the log information collecting unit 222. Also in operation 610, the log information collecting unit 222 receives the computing service request. In operation 620, the log information collecting unit 222 collects log information from information of a computing service request each time a computing service request is received from the request handler 210. The log information collecting unit 222 stores the collected log information in the log information storing unit 224.

If a predetermined amount of information is obtained or a preset time passes, in operation 630 the analyzing unit 226 analyzes the information stored in the log information storing unit 224. The analyzing unit 226 may analyze a type and/or number of virtual devices to be reserved at the present time. In operation 640, the analyzing unit 226 predicts the minimum number of virtual machine instances to be launched for reserving a predetermined type and/or number of virtual devices predicted based on the analysis result.

In operation 650, the prediction result of the analyzing unit 226 is transmitted to the VM manager 230, and the VM manager 230 generates the minimum number of virtual machine instances in advance based on the prediction result.

In addition, in operation 660 the prediction result is transmitted to the VD manager 240, and the VD manager 240 generates as many virtual device instances as the predicted number of virtual devices in advance.

Accordingly, the management server analyzes the accumulated log information of the clients at the time when receiving a computing service request, or at a predetermined time, and prepares virtual machines and virtual devices to be used, in advance. Hence, a service preparation time may be minimized for on-demand resources of the server farm. Accordingly, the system is able to provide a user with resources of the server farm more efficiently. Furthermore, a virtual device is generated using resources of the server farm, so that a device that a user does not possess may be used. For example, a user of an ANDROID®-based mobile phone may be provided with a SYMBIAN®-based virtual device using a resource of a server farm, and thus may use a device that the user does not have physically stored in the user's terminal.

As a non-exhaustive illustration only, the terminal device described herein may refer to mobile devices such as a cellular phone, a personal digital assistant (PDA), a digital camera, a portable game console, and an MP3 player, a portable/personal multimedia player (PMP), a handheld e-book, a portable lab-top personal computer (PC), a global positioning system (GPS) navigation, and devices such as a desktop PC, a high definition television (HDTV), an optical disc player, a setup box, and the like capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus to manage one or more servers to provide a cloud computing service, the apparatus comprising:

a management server device configured to deploy at least one virtual machine on the one or more servers to predict in advance a client's request for the cloud computing service,
configured to deploy at least one virtual device on the deployed virtual machine to predict in advance the client's computing service request, and
configured to process the request for the computing service from the client and to provide the client with the at least one deployed virtual machine and the at least one deployed virtual device.

2. The apparatus of claim 1, further comprising:
a resource pool comprising a management list for managing the virtual machines and the virtual devices that are operated on the one or more servers,
wherein the resource pool is configured to be used to determine whether a virtual device is capable of being provided, based on the computing service request.

3. The apparatus of claim 2, wherein the management list comprises at least one of: status information, performance information, user access information, and computing service information, with respect to the at least one virtual machine and the at least one virtual device.

4. The apparatus of claim 1, further comprising a predicting unit to predict a type and/or a number of virtual devices to be operated on the one or more servers.

5. The apparatus of claim 4, wherein the management server device is further configured to:
reserve the predicted number of virtual devices and enough virtual machines to support the predicted number of virtual devices, before the computing service request is received from the client; and
provide the reserved virtual devices in response to the computing service request.

6. The apparatus of claim 4, wherein the predicting unit is further configured to predict the minimum number of virtual machines that are needed for reserving the predicted type and/or the number of virtual devices.

7. The apparatus of claim 4, wherein the predicting unit comprises:
a log information storing unit configured to accumulate and store log information of computing services;
a log information collecting unit configured to receive information corresponding to the computing service request made by the client and to store the log information generated from the information of the computing service request, and
an analyzing unit configured to analyze the type and/or the number of virtual devices to be operated on the one or more servers, based on the information stored in the log information storing unit.

8. The apparatus of claim 7, wherein the log information comprises information of:
virtual devices requested by a plurality of clients;
computing service usage duration; and
computing service request time.

9. The apparatus of claim 1, further comprising a storage device configured to store user specific data generated for a computing service that a client has previously used,
wherein, in response to the client requesting a previously used computing service, the management server device is further configured to:
restore the stored user specific data to a virtual device corresponding to the previously used computing service, and
provide the restored virtual device to the client.

10. The apparatus of claim 1, wherein the management server device is configured to deploy the at least one virtual machine and the at least one virtual device before the request of the client is received, and
in response to receiving the request for the computing service from the client, the request handler is configured to provide the deployed at least one virtual machine and the at least one virtual device without having to load and boot the at least one virtual machine and the at least one virtual device.

11. The apparatus of claim 1, wherein the at least one virtual device comprises at least one consumer electronic (CE) program.

12. A method for providing a cloud computing service from a server farm comprising one or more servers, the method comprising:
receiving, at the one or more servers, a cloud computing service request from a client; and
performing a computing operation using the one or more servers based on the computing service request using at least one previously deployed virtual device to predict in advance a demand for computing resources,
wherein the at least one previously deployed virtual device is operated on at least one previously deployed virtual machine and the at least one previously deployed virtual machine is configured to be used in a multiplexed fashion.

13. The method of claim 12, further comprising determining whether a virtual device according to the computing service request is capable of being provided, based on a resource pool that comprises a management list for managing the virtual machines and the virtual devices that are operated on the one or more servers.

14. The method of claim 13, wherein the management list comprises at least one of: status information, performance information, user access information, and computing service information, with respect to the at least one previously deployed virtual machine and the at least one previously deployed virtual device.

15. The method of claim 12, further comprising:
predicting a type and a number of the virtual devices to be operated on the server farm, in advance;
predicting enough virtual machines to support the predicted number of virtual devices, based on the prediction result; and
deploying the predicted number of virtual machines on the one or more servers.

16. The method of claim 15, wherein the predicting of the number of virtual machines comprises predicting the minimum number of virtual machines needed for reserving the predicted type and/or the number of virtual devices.

17. The method of claim 15, wherein the predicting of the type and/or the number of virtual devices comprises:
storing log information of computing services of a plurality of clients in a log information storing unit; and
predicting the type and/or number of virtual devices to be operated on the one or more servers based on the stored log information.

18. The method of claim 17, wherein the log information comprises information of:
virtual devices requested by a plurality of clients;
computing service usage duration; and
computing service request time.

19. The method of claim 12, further comprising:
storing, in a storage device, user specific data generated for a computer service that has previously been used by the client;

in response to the client requesting a previously used computing service, restoring the stored user specific data to a virtual device corresponding to the computing service request; and providing the restored virtual device to the client.

* * * * *